United States Patent
Yang

(10) Patent No.: US 11,153,757 B2
(45) Date of Patent: Oct. 19, 2021

(54) METHOD FOR INSTRUCTING USER EQUIPMENT TO OBTAIN KEY, USER EQUIPMENT AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/142,046

(22) Filed: Jan. 5, 2021

(65) Prior Publication Data

US 2021/0127270 A1   Apr. 29, 2021

Related U.S. Application Data

(63) Continuation of application No. PCT/CN2018/073400, filed on Jan. 19, 2018.

(51) Int. Cl.
| | |
|---|---|
| *H04L 29/06* | (2006.01) |
| *H04W 12/08* | (2021.01) |
| *H04W 76/19* | (2018.01) |
| *H04W 76/11* | (2018.01) |
| *H04W 76/27* | (2018.01) |
| *H04W 12/041* | (2021.01) |
| *H04W 12/06* | (2021.01) |

(52) U.S. Cl.
CPC ......... *H04W 12/08* (2013.01); *H04W 12/041* (2021.01); *H04W 12/06* (2013.01); *H04W 76/11* (2018.02); *H04W 76/19* (2018.02); *H04W 76/27* (2018.02)

(58) Field of Classification Search
CPC ... H04W 12/06; H04W 12/08; H04W 12/041; H04W 76/11; H04W 76/19; H04W 9/08; H04W 76/27
See application file for complete search history.

(56) References Cited

U.S. PATENT DOCUMENTS

| | | | |
|---|---|---|---|
| 8,938,071 B2* | 1/2015 | Feng | H04W 12/041 380/44 |
| 9,338,136 B2* | 5/2016 | Nair | H04W 12/03 |

(Continued)

FOREIGN PATENT DOCUMENTS

| | | |
|---|---|---|
| CN | 102238541 A | 11/2011 |
| CN | 102056157 B | 9/2013 |

(Continued)

OTHER PUBLICATIONS

3GPP TSG-RAN WG1#90 R1-1712954,"Multiple SS Blocks per carrier", Ericsson, Prague, Czech Republic, Aug. 21-25, 2017.

(Continued)

*Primary Examiner* — Hosuk Song
(74) *Attorney, Agent, or Firm* — Perkins Coie LLP

(57) ABSTRACT

A method for generating a key includes: obtaining key parameters indicated by a network side, the key parameters at least comprising a next hop chaining counter (NCC) and frequency point information for generating a key, the frequency information being a frequency of one Synchronization Signal Block (SSB) of a target cell; and generating an AS key based on the key parameters.

20 Claims, 6 Drawing Sheets

---

101

Key parameters indicated by a network side are obtained

↓

102

An AS key is generated based on the key parameters, and a security function is enabled

(56) References Cited

U.S. PATENT DOCUMENTS

| | | | |
|---|---|---|---|
| 9,386,448 B2* | 7/2016 | Feng | H04W 12/041 |
| 9,467,849 B2* | 10/2016 | Zhang | H04L 5/0098 |
| 10,432,291 B2* | 10/2019 | Agiwal | H04W 24/02 |
| 10,728,757 B2* | 7/2020 | Wu | H04W 12/009 |
| 10,917,932 B2* | 2/2021 | Kim | H04W 72/0406 |

FOREIGN PATENT DOCUMENTS

| | | |
|---|---|---|
| CN | 104125563 A | 10/2014 |
| CN | 106658492 A | 5/2017 |
| CN | 106788989 A | 5/2017 |
| CN | 103609154 B | 8/2017 |
| WO | 2016177100 A1 | 11/2016 |
| WO | 2017129288 A1 | 8/2017 |

OTHER PUBLICATIONS

3GPP TSG-RAN2#101bis R2-1804551, "Left issues for Inactive security framework", OPPO, Sanya, P. R. China, Apr. 16-Apr. 20, 2018.

International Search Report in the international application No. PCT/CN2018/073400, dated Oct. 10, 2018.

Written Opinion of the International Search Authority in the international application No. PCT/CN2018/073400, dated Oct. 10, 2018.

First Office Action of the Chinese application No. 201880036973.7, dated Jun. 9, 2020.

Second Office Action of the Chinese application No. 201880036973.7, dated Aug. 4, 2020.

* cited by examiner

METHOD FOR INSTRUCTING USER EQUIPMENT TO OBTAIN KEY, USER EQUIPMENT AND NETWORK DEVICE

CROSS-REFERENCE TO RELATED APPLICATIONS

This application is a continuation application of PCT Application No. PCT/CN2018/073400 filed on Jan. 19, 2018, the disclosure of which is hereby incorporated by reference in its entity.

BACKGROUND

When communication processing is performed in a 5G communication system, a wideband carrier containing multiple Synchronization Signal Blocks (SSBs) is seen as one cell from the perspective of a base station. Thus, all UEs in connected states are connected to this wideband carrier; regardless of which SSB is associated with, a Cell-Radio Network Temporary Identifier (C-RNTI) is assigned uniformly to manage UE Access Stratum (AS) context uniformly. However, no specific solution is proposed in terms of the security of UE communication so far.

SUMMARY

The disclosure relates to the field of information processing technology, and in particular to, a method for instructing user equipment (UE) to obtain a key, a network device, UE, and a computer storage medium.

According to the embodiments of the disclosure, there is provided a method for generating a key, applied to UE, the method including: obtaining key parameters indicated by a network side, wherein the key parameters include at least a Next Hop Chaining Counter (NCC), and frequency information for generating the key, the frequency information being a frequency of one Synchronization Signal Block (SSB) of a target cell; and generating an Access Stratum (AS) key based on the key parameters.

According to the embodiments of the disclosure, there is provided a method for generating a key, applied to a network device, the method including: indicating key parameters to User Equipment (UE), wherein the key parameters include at least a Next Hop Chaining Counter (NCC) and frequency information for generating the key, the frequency information being a frequency of one Synchronization Signal Block (SSB) of a target cell, and the key parameters being used by the UE for generating an Access Stratum (AS) key.

According to the embodiments of the disclosure, there is provided UE, including: a memory storing processor-executable instructions; and a processor configured to execute the stored processor-executable instructions to perform operations of: obtaining key parameters indicated by a network side, wherein the key parameters include at least a Next Hop Chaining Counter (NCC) and frequency information for generating a key, the frequency information being a frequency of one Synchronization Signal Block (SSB) of a target cell; and generating an Access Stratum (AS) key based on the key parameters.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

First Embodiment

Figure 1:
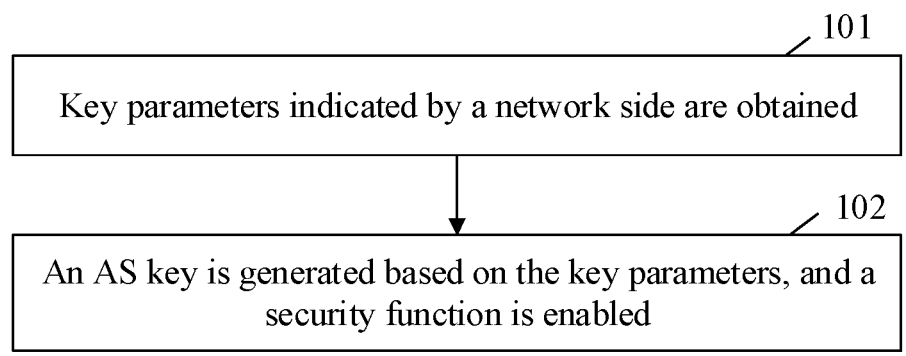
FIG. 1 is a first flowchart of a method for instructing UE to obtain a key according to an embodiment of the disclosure.

The embodiment of the disclosure provides a method for instructing UE to obtain a key, which is applied to UE. As shown in FIG. 1, the method includes the following operations.

In operation 101, key parameters indicated by a network side are obtained, herein the key parameters include at least an NCC and frequency information for generating the key.

In operation 102, an AS key is generated based on the key parameters, and a security function is enabled.

The embodiment of the disclosure can be applied at least in the following scenarios.

A first scenario is a scenario of RRC connection reestablishment or RRC connection resume (in this scenario, if all SSBs of the wideband carrier correspond to a same PCI, there is no need to indicate PCI information, thus PCI is optional).

Specifically, the operation that the key parameters indicated by the network side are obtained includes:

the UE initiates an RRC connection reestablishment request or an RRC connection resume request to a target wideband carrier of a target cell on the network side; and an RRC connection reestablishment message or an RRC connection resume message fed back from the network side is received, and the key parameters are obtained through the RRC connection reestablishment message or the RRC connection resume message.

Herein, the key parameters further include PCI information corresponding to the cell.

A target wideband carrier containing multiple SSBs is seen as one cell from the perspective of the base station, so all connected states are connected to this wideband carrier, regardless of which SSB is associated with, a C-RNTI is assigned uniformly to manage UE AS context uniformly.

In order to meet the success probability of the RRC connection reestablishment or RRC connection resume process, it is necessary to prepare a UE context in multiple cells. For example, before handover, the UE context is prepared in multiple possible cells, so that the UE can successfully initiate RRC connection reestablishment or RRC connection resume in the cell, rather than fail to do so due to absence of the UE context.

During preparation process in the multiple cells, a source cell only prepares one UE context for the target wideband carrier, and when calculating the target cell key KeNB*, if multiple SSBs exist in the target wideband carrier, the source cell only calculates the key KeNB* of the target cell according to a frequency where one SSB of the target wideband carrier is located and PCI information (optional) corresponding to the SSB. Furthermore, the source cell will notify the frequency information and PCI information used for calculating the target cell key KeNB* for the target wideband carrier.

The operation that the UE initiates the RRC connection reestablishment request or the RRC connection resume request to the target wideband carrier of the target cell on the network side includes:

authentication code information is carried in the RRC connection reestablishment request or the RRC connection resume request. In other words, when the UE initiates an RRC connection reestablishment request or an RRC connection resume request to a target bandwidth carrier, the message carries shortMAC-I (i.e., authentication code information) information, and the wideband carrier searches for stored UE AS context information according to shortMAC-I.

Correspondingly, if the network side finds the UE context information, the wideband carrier replies with an RRC connection reestablishment message or an RRC connection resume message, and the message carries key related parameters, namely NCC, frequency information for generating the key, and optional PCI information.

The UE receives the RRC connection reestablishment message or the RRC connection resume message, obtains the key related parameters, generates the key, configures the wireless configuration, enables the AS security function, performs encryption and integrity protection on the RRC connection reestablishment complete message or RRC connection resume complete message, and sends the RRC connection reestablishment complete message or RRC connection resume complete message subjected to encryption and integrity protection to the network side.

A second scenario is a handover scenario (if all SSBs of the wideband carrier correspond to a same PCI, there is no need to indicate PCI information, thus PCI is optional).

The method further includes: a measurement report is reported to a network device corresponding to a source cell. In this scenario, the UE reports a measurement report to trigger the network side to make a handover decision.

Correspondingly, on the network side, the source cell generates the key KeNB* and sends the key to the target cell through an Xn interface, and moreover, indicates, to the target cell, the frequency information and PCI information that are used for generating the key.

Then, the operation that the key parameters indicated by the network side are obtained includes: a handover instruction sent by the network device corresponding to the source cell is received, and key parameters for a target cell are obtained from the handover instruction, herein the key parameters for the target cell include the NCC and a frequency. The key parameters for the target cell further include PCI information.

That is to say, the source cell sends the handover instruction to the UE, and the handover instruction includes the target cell key generation related parameters, i.e., NCC, frequency and PCI information. Finally, the UE generates the AS key according to the key related parameters in the handover instruction to activate the AS security function.

As can be seen, by adopting the above solution, the key parameters of the UE can be obtained from the network side, and the key parameters includes the NCC and the frequency information for generating the key, so that the UE side is enabled to generate a corresponding key based on the key parameters, and then perform encrypted communication; in this way, the security of the communication between the UE and the network side is ensured.

Second Embodiment

The embodiment of the disclosure provides a method for instructing UE to obtain a key, which is applied to a network device, the method includes the following operations.

Key parameters are indicated to the UE, herein the key parameters include at least an NCC and frequency information for generating the key.

The embodiment of the disclosure can be applied at least in the following scenarios.

Figure 2:
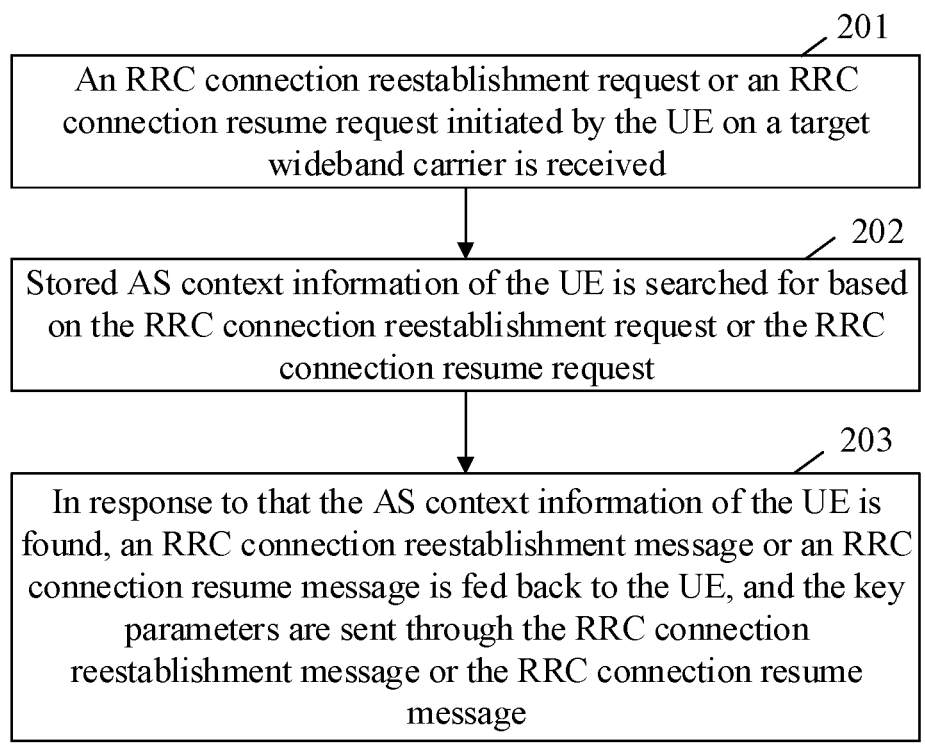
FIG. 2 is a second flowchart of a method for instructing UE to obtain a key according to an embodiment of the disclosure.

A first scenario is a scenario of RRC connection reestablishment or RRC connection resume (in this scenario, if all SSBs of the wideband carrier correspond to a same PCI, there is no need to indicate PCI information, thus PCI is optional). Specifically, as shown in FIG. 2, it includes the following operations.

In operation 201, an RRC connection reestablishment request or an RRC connection resume request initiated by the UE on a target wideband carrier is received.

In operation 202, stored AS context information of the UE is searched for based on the RRC connection reestablishment request or the RRC connection resume request.

In operation 203, in response to that the AS context information of the UE is found, an RRC connection reestablishment message or an RRC connection resume message is fed back to the UE, and the key parameters are sent through the RRC connection reestablishment message or the RRC connection resume message.

Herein, the key parameters further include PCI information corresponding to a cell.

A target wideband carrier containing multiple SSBs is seen as one cell from the perspective of the base station, so all connected states are connected to this wideband carrier, regardless of which SSB is associated with, a C-RNTI is assigned uniformly to manage UE AS context uniformly.

In order to meet the success probability of the RRC connection reestablishment or RRC connection resume process, it is necessary to prepare a UE context in multiple cells. For example, before handover, the UE context is prepared in multiple possible cells, so that the UE can successfully initiate RRC connection reestablishment or RRC connection resume in the cell, rather than fail to do so due to absence of the UE context.

During preparation process in the multiple cells, the AS context information of the UE is saved for a target wideband carrier of a target cell; and in response to that at least two SSBs exist in the target wideband carrier of the target cell, a key of the target cell is calculated according to a frequency where one SSB of the at least two SSBs is located and PCI information corresponding to the SSB, and frequency information and the PCI information used for calculating the key of the target cell are sent to the target cell.

That is to say, a source cell only prepares one UE context for the target wideband carrier, and when calculating the target cell key KeNB*, if multiple SSBs exist in the target wideband carrier, the source cell only calculates the key KeNB* of the target cell according to a frequency where one SSB of the target wideband carrier is located and PCI information (optional) corresponding to the SSB. Furthermore, the source cell will notify the frequency information and PCI information used for calculating the target cell key KeNB* for the target wideband carrier.

Correspondingly, if the network side finds the UE context information, the wideband carrier replies with an RRC connection reestablishment message or an RRC connection resume message, and the message carries key related parameters, namely NCC, frequency information for generating the key, and optional PCI information.

The UE receives the RRC connection reestablishment message or the RRC connection resume message, obtains the key related parameters, generates the key, configures the wireless configuration, enables the AS security function, performs encryption and integrity protection on the RRC connection reestablishment complete message or RRC connection resume complete message, and sends the RRC connection reestablishment complete message or RRC connection resume complete message subjected to encryption and integrity protection to the network side.

Figure 3:
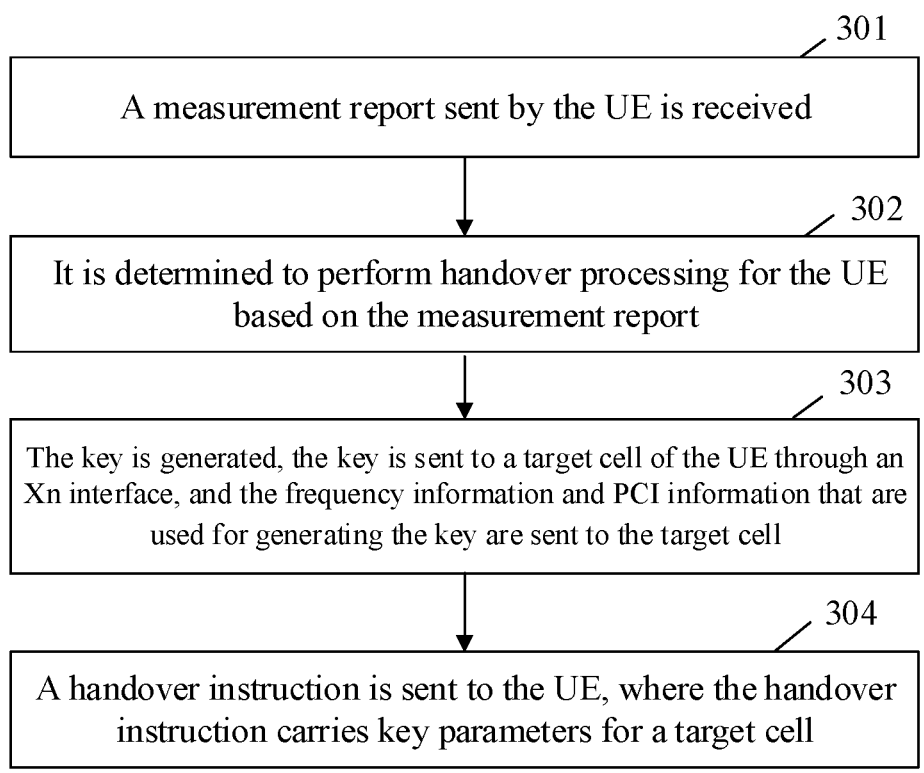
FIG. 3 is a fourth flowchart of a method for instructing UE to obtain a key according to an embodiment of the disclosure.

A second scenario is a handover scenario (if all SSBs of the wideband carrier correspond to a same PCI, there is no need to indicate PCI information, thus PCI is optional). Specifically, as shown in FIG. 3, it includes the following operations.

In operation 301, a measurement report sent by the UE is received.

In operation 302, it is determined to perform handover processing for the UE based on the measurement report.

In operation 303, the key is generated, the key is sent to a target cell of the UE through an Xn interface, and the frequency information and PCI information that are used for generating the key are sent to the target cell.

In operation 304, a handover instruction is sent to the UE, the handover instruction carries key parameters for a target cell, and the key parameters for the target cell include the NCC and a frequency.

In this scenario, the UE reports a measurement report to trigger the network side to make a handover decision.

Correspondingly, on the network side, the source cell generates the key KeNB* and sends the key to the target cell through an Xn interface, and moreover, indicates, to the target cell, the frequency information and PCI information that are used for generating the key.

Then, the source cell sends the handover instruction to the UE, and the handover instruction includes the target cell key generation related parameters, i.e., NCC, frequency and PCI information. Finally, the UE generates the AS key according to the key related parameters in the handover instruction to activate the AS security function.

As can be seen, by adopting the above solution, the key parameters of the UE can be obtained from the network side, and the key parameters includes the NCC and the frequency information for generating the key, so that the UE side is enabled to generate a corresponding key based on the key parameters, and then perform encrypted communication; in this way, the security of the communication between the UE and the network side is ensured.

Third Embodiment

Figure 4:
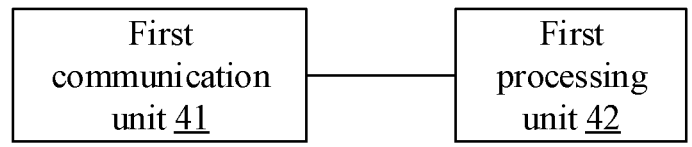
FIG. 4 is a schematic structural diagram of UE according to an embodiment of the disclosure.

The embodiment of the disclosure provides UE, as shown in FIG. 4, including:

a first communication unit 41, configured to obtain key parameters indicated by a network side, herein the key parameters include at least an NCC and frequency information for generating a key; and a first processing unit 42, configured to generate an AS key based on the key parameters, and enabling a security function.

The embodiment of the disclosure can be applied at least in the following scenarios.

A first scenario is a scenario of RRC connection reestablishment or RRC connection resume (in this scenario, if all SSBs of the wideband carrier correspond to a same PCI, there is no need to indicate PCI information, thus PCI is optional).

Specifically, the first communication unit 41 is configured to: initiate an RRC connection reestablishment request or an RRC connection resume request to a target wideband carrier of a target cell on the network side; and receive an RRC connection reestablishment message or an RRC connection resume message fed back from the network side, and obtain the key parameters through the RRC connection reestablishment message or the RRC connection resume message.

Herein, the key parameters further include PCI information corresponding to the cell.

A target wideband carrier containing multiple SSBs is seen as one cell from the perspective of the base station, so all connected states are connected to this wideband carrier, regardless of which SSB is associated with, a C-RNTI is assigned uniformly to manage UE AS context uniformly.

In order to meet the success probability of the RRC connection reestablishment or RRC connection resume process, it is necessary to prepare a UE context in multiple cells. For example, before handover, the UE context is prepared in multiple possible cells, so that the UE can successfully initiate RRC connection reestablishment or RRC connection resume in the cell, rather than fail to do so due to absence of the UE context.

During preparation process in the multiple cells, a source cell only prepares one UE context for the target wideband carrier, and when calculating the target cell key KeNB*, if multiple SSBs exist in the target wideband carrier, the source cell only calculates the key KeNB* of the target cell according to a frequency where one SSB of the target wideband carrier is located and PCI information (optional) corresponding to the SSB. Furthermore, the source cell will notify the frequency information and PCI information used for calculating the target cell key KeNB* for the target wideband carrier.

The first communication unit 41 is configured to carry authentication code information in the RRC connection reestablishment request or the RRC connection resume request. In other words, when the UE initiates an RRC connection reestablishment request or an RRC connection resume request to a target bandwidth carrier, the message carries shortMAC-I (i.e., authentication code information) information, and the wideband carrier searches for stored UE AS context information according to shortMAC-I.

Correspondingly, if the network side finds the UE context information, the wideband carrier replies with an RRC connection reestablishment message or an RRC connection resume message, and the message carries key related parameters, namely NCC, frequency information for generating the key, and optional PCI information.

The UE receives the RRC connection reestablishment message or the RRC connection resume message, obtains the key related parameters, generates the key, configures the wireless configuration, enables the AS security function, performs encryption and integrity protection on the RRC connection reestablishment complete message or RRC connection resume complete message, and sends the RRC connection reestablishment complete message or RRC connection resume complete message subjected to encryption and integrity protection to the network side.

A second scenario is a handover scenario (if all SSBs of the wideband carrier correspond to a same PCI, there is no need to indicate PCI information, thus PCI is optional).

The first communication unit 41 reports a measurement report to a network device corresponding to a source cell. In this scenario, the UE reports a measurement report to trigger the network side to make a handover decision.

Correspondingly, on the network side, the source cell generates the key KeNB* and sends the key to the target cell through an Xn interface, and moreover, indicates, to the target cell, the frequency information and PCI information that are used for generating the key.

Then, the first communication unit 41 receives a handover instruction sent by the network device corresponding to the source cell, and obtains key parameters for a target cell from the handover instruction, herein the key parameters for the target cell include the NCC and a frequency. The key parameters for the target cell further include PCI information.

That is to say, the source cell sends the handover instruction to the UE, and the handover instruction includes the target cell key generation related parameters, i.e., NCC, frequency and PCI information. Finally, the UE generates the AS key according to the key related parameters in the handover instruction to activate the AS security function.

Figure 5:
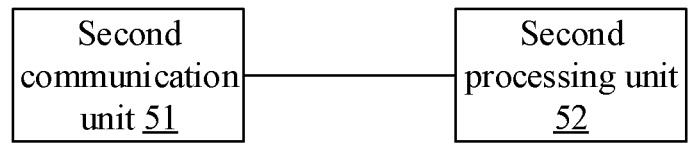
FIG. 5 is a schematic structural diagram of a network device according to an embodiment of the disclosure.

As can be seen, by adopting the above solution, the key parameters of the UE can be obtained from the network side, and the key parameters includes the NCC and the frequency information for generating the key, so that the UE side is enabled to generate a corresponding key based on the key parameters, and then perform encrypted communication; in this way, the security of the communication between the UE and the network side is ensured Fourth Embodiment The embodiment of the disclosure provides a network device, as shown in FIG. 5, including:

a second communication unit 51, configured to indicate key parameters to UE, herein the key parameters include at least an NCC and frequency information for generating a key.

The embodiment of the disclosure can be applied at least in the following scenarios.

A first scenario is a scenario of RRC connection reestablishment or RRC connection resume (in this scenario, if all SSBs of the wideband carrier correspond to a same PCI, there is no need to indicate PCI information, thus PCI is optional). Specifically, the network device further includes:

a second processing unit 52, configured to search for stored AS context information of the UE based on an RRC connection reestablishment request or an RRC connection resume request.

Correspondingly, the second communication unit is configured to: receive the RRC connection reestablishment request or the RRC connection resume request initiated by the UE on a target wideband carrier; and in response to that the AS context information of the UE is found, feed back an RRC connection reestablishment message or an RRC connection resume message to the UE, and send the key parameters through the RRC connection reestablishment message or the RRC connection resume message.

Herein, the key parameters further include PCI information corresponding to a cell.

A target wideband carrier containing multiple SSBs is seen as one cell from the perspective of the base station, so all connected states are connected to this wideband carrier, regardless of which SSB is associated with, a C-RNTI is assigned uniformly to manage UE AS context uniformly.

In order to meet the success probability of the RRC connection reestablishment or RRC connection resume process, it is necessary to prepare a UE context in multiple cells. For example, before handover, the UE context is prepared in multiple possible cells, so that the UE can successfully initiate RRC connection reestablishment or RRC connection resume in the cell, rather than fail to do so due to absence of the UE context.

During preparation process in the multiple cells, the second processing unit 52 saves the AS context information of the UE for a target wideband carrier of a target cell; and in response to that at least two SSBs exist in the target wideband carrier of the target cell, a key of the target cell is calculated according to a frequency where one SSB of the at least two SSBs is located and PCI information corresponding to the SSB, and frequency information and the PCI information used for calculating the key of the target cell are sent to the target cell.

That is to say, a source cell only prepares one UE context for the target wideband carrier, and when calculating the target cell key KeNB*, if multiple SSBs exist in the target wideband carrier, the source cell only calculates the key KeNB* of the target cell according to a frequency where one SSB of the target wideband carrier is located and PCI information (optional) corresponding to the SSB. Furthermore, the source cell will notify the frequency information and PCI information used for calculating the target cell key KeNB* for the target wideband carrier.

Correspondingly, if the second processing unit 52 finds the UE context information, the wideband carrier replies with an RRC connection reestablishment message or an RRC connection resume message, and the message carries key related parameters, namely NCC, frequency information for generating the key, and optional PCI information.

The UE receives the RRC connection reestablishment message or the RRC connection resume message, obtains the key related parameters, generates the key, configures the wireless configuration, enables the AS security function, performs encryption and integrity protection on the RRC connection reestablishment complete message or RRC connection resume complete message, and sends the RRC connection reestablishment complete message or RRC connection resume complete message subjected to encryption and integrity protection to the network side.

A second scenario is a handover scenario (if all SSBs of the wideband carrier correspond to a same PCI, there is no need to indicate PCI information, thus PCI is optional). Specifically, the second processing unit 52, configured to determine, based on the measurement report, to perform handover processing for the UE; and the second communication unit 51 is configured to receive a measurement report sent by the UE.

In this scenario, the UE reports a measurement report to trigger the network side to make a handover decision.

Correspondingly, the second processing unit 52 is configured to generate the key; and the second communication unit 51 is configured to send the key to a target cell of the UE through an Xn interface, and send, to the target cell, the frequency information and PCI information that are used for generating the key.

That is to say, the source cell generates the key KeNB* and sends the key to the target cell through an Xn interface, and moreover, indicates, to the target cell, the frequency information and PCI information that are used for generating the key.

Then, the second communication unit sends a handover instruction to the UE, herein the handover instruction carries key parameters for a target cell, and the key parameters for the target cell include the NCC and a frequency. That is to say, the handover instruction is sent to the UE, and the handover instruction includes the target cell key generation related parameters, i.e., NCC, frequency and PCI information. Finally, the UE generates the AS key according to the key related parameters in the handover instruction to activate the AS security function.

As can be seen, by adopting the above solution, the key parameters of the UE can be obtained from the network side, and the key parameters includes the NCC and the frequency information for generating the key, so that the UE side is enabled to generate a corresponding key based on the key parameters, and then perform encrypted communication; in this way, the security of the communication between the UE and the network side is ensured.

Figure 6:
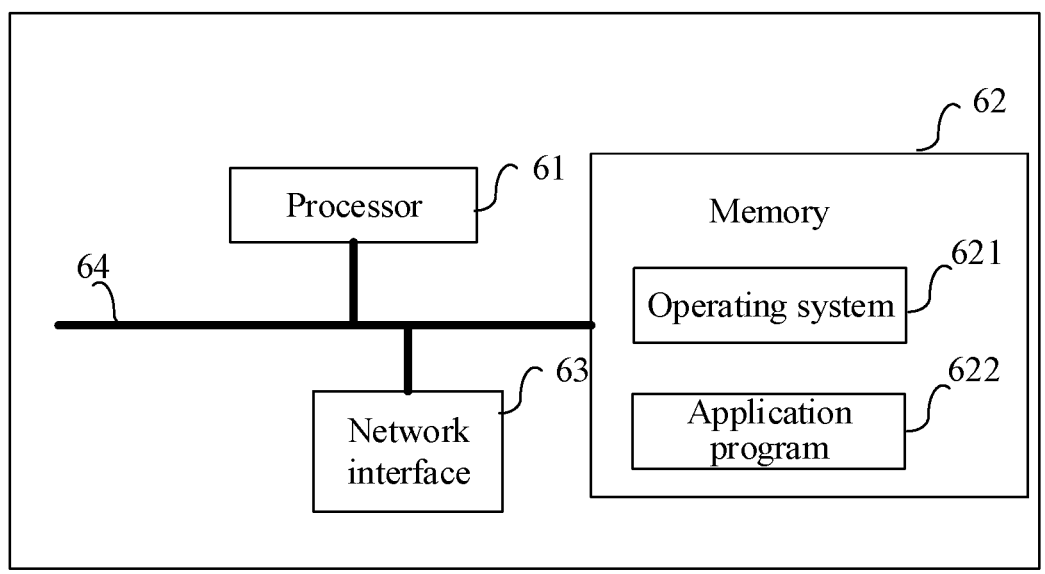
FIG. 6 is a schematic diagram of a hardware architecture according to an embodiment of the disclosure.

The embodiments of the disclosure also provide a hardware composition architecture of UE or a receiving device, which, as shown in FIG. 6, includes at least one processor 61, a memory 62 and at least one network interface 63. Each component is coupled together through a bus system 64. It may be understood that the bus system 64 is configured to implement connection communication between these components. The bus system 64 includes a data bus and further includes a power bus, a control bus and a state signal bus. However, for clear description, various buses are marked as the bus system 64 in FIG. 6.

It can be understood that the memory 62 in the embodiments of the disclosure may be a volatile memory or a nonvolatile memory, or may include both the volatile and nonvolatile memories.

In some implementations, the memory 62 is configured to store the following elements: executable modules or data structures, or a subset thereof or an extended set thereof; and
an operating system 621 and an application program 622.

The processor 61 is configured to be capable of processing the operations of the method in the first embodiment or the second embodiment, which will not be elaborated herein.

The embodiments of the disclosure provide a computer storage medium, which stores computer-executable instructions that, when being executed, implement the operations of the method in the first embodiment or the second embodiment.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, the computer program being configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for generating a key, applied to a piece of User Equipment (UE), the method comprising:
    obtaining key parameters indicated by a network side, wherein the key parameters comprise at least a Next Hop Chaining Counter (NCC), and frequency information for generating the key, the frequency information being a frequency of one Synchronization Signal Block (SSB) of a target cell; and
    generating an Access Stratum (AS) key based on the key parameters.

2. The method of claim 1, wherein the key parameters for the target cell further comprises Physical Cell Identity (PCI) information.

3. The method of claim 2, wherein the AS key is generated based on the NCC, the frequency information and the PCI information.

4. The method of claim 1, wherein obtaining the key parameters indicated by the network side comprises:
    receiving a handover instruction sent by a network device corresponding to a source cell, and obtaining key parameters for the target cell from the handover instruction.

5. The method of claim 1, wherein before handing over to the target cell,
    the UE initiates a Radio Resource Control (RRC) connection reestablishment request to the target cell on the network side; and
    the UE receives an RRC connection reestablishment message fed back from the network side, and obtains the key parameters through the RRC connection reestablishment message, the key parameters comprising the NCC.

6. The method of claim 5, wherein initiating, by the UE, the RRC connection reestablishment request to the target cell on the network side comprises:
    carrying authentication code information in the RRC connection reestablishment request.

7. The method of claim 1, further comprising:
    reporting a measurement report to a network device corresponding to a source cell.

8. A method for generating a key, applied to a network device, the method comprising:
    indicating key parameters to a piece of User Equipment (UE), wherein the key parameters comprise at least a Next Hop Chaining Counter (NCC) and frequency information for generating the key, the frequency information being a frequency of one Synchronization Signal Block (SSB) of a target cell, and the key parameters being used by the UE for generating an Access Stratum (AS) key.

9. The method of claim 8, wherein a Radio Resource Control (RRC) connection reestablishment request initiated by the UE on a target wideband carrier is received;

stored Access Stratum (AS) context information of the UE is searched for based on the RRC connection reestablishment request; and in response to that the AS context information of the UE is found, an RRC connection reestablishment message is fed back to the UE, and the key parameters are sent through the RRC connection reestablishment message, the key parameters comprising the NCC.

10. The method of claim 9, further comprising:

saving the AS context information of the UE for a target cell; and in response to that at least two Synchronization Signal Blocks (SSBs) exist in the target cell, calculating a key of the target cell according to a frequency where one SSB of the at least two SSBs is located and PCI information corresponding to the SSB, and sending, to the target cell, frequency information and the PCI information used for calculating the key of the target cell.

11. The method of claim 8, further comprising:

receiving a measurement report sent by the UE; and determining, based on the measurement report, to perform handover processing for the UE.

12. The method of claim 11, further comprising:

generating the key, sending the key to a target cell of the UE through an Xn interface, and sending, to the target cell, the frequency information and PCI information that are used for generating the key.

13. A piece of User Equipment (UE), comprising:

a memory storing processor-executable instructions; and a processor configured to execute the stored processor-executable instructions to perform operations of:

obtaining key parameters indicated by a network side, wherein the key parameters comprise at least a Next Hop Chaining Counter (NCC) and frequency information for generating a key, the frequency information being a frequency of one Synchronization Signal Block (SSB) of a target cell; and generating an Access Stratum (AS) key based on the key parameters.

14. The UE of claim 13, wherein the key parameters for the target cell further comprises Physical Cell Identity (PCI) information.

15. The UE of claim 14, wherein the AS key is generated based on the NCC, the frequency information and the PCI information.

16. The UE of claim 13, wherein obtaining the key parameters indicated by the network side comprises:

receiving a handover instruction sent by a network device corresponding to a source cell, and obtaining key parameters for the target cell from the handover instruction.

17. The UE of claim 13, wherein before handing over to the target cell, the UE initiates a Radio Resource Control (RRC) connection reestablishment request to the target cell on the network side; and the UE receives an RRC connection reestablishment message fed back from the network side, and obtains the key parameters through the RRC connection reestablishment message, the key parameters comprising the NCC.

18. The UE of claim 17, wherein initiating, by the UE, the RRC connection reestablishment request to the target cell on the network side comprises:

carrying authentication code information in the RRC connection reestablishment request.

19. The UE of claim 13, wherein the processor is configured to execute the stored processor-executable instructions to further perform an operations of:

reporting a measurement report to a network device corresponding to a source cell.

20. A network device, comprising:

a memory storing processor-executable instructions; and a processor configured to execute the stored processor-executable instructions to perform an operation of:

indicating key parameters to User Equipment (UE), wherein the key parameters comprise at least a Next Hop Chaining Counter (NCC) and frequency information for generating the key, the frequency information being a frequency of one Synchronization Signal Block (SSB) of a target cell, and the key parameters being used by the UE for generating an Access Stratum (AS) key.

* * * * *